US011817933B2

(12) United States Patent
Tang et al.

(10) Patent No.: US 11,817,933 B2
(45) Date of Patent: *Nov. 14, 2023

(54) 5G NEW RADIO BEAM REFINEMENT PROCEDURE

(71) Applicant: Apple Inc., Cupertino, CA (US)

(72) Inventors: Jia Tang, San Jose, CA (US); Beibei Wang, San Jose, CA (US); Dawei Zhang, Saratoga, CA (US); Haitong Sun, Irvine, CA (US); Johnson O. Sebeni, Fremont, CA (US); Pengkai Zhao, San Jose, CA (US); Ping Wang, San Jose, CA (US); Wei Zeng, Sang Diego, CA (US); Yang Li, Santa Clara, CA (US); Zhu Ji, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/873,934

(22) Filed: Jul. 26, 2022

(65) Prior Publication Data
US 2022/0368403 A1 Nov. 17, 2022

Related U.S. Application Data

(63) Continuation of application No. 17/202,185, filed on Mar. 15, 2021, now Pat. No. 11,405,095, which is a
(Continued)

(51) Int. Cl.
*H04B 7/08* (2006.01)
*H04B 7/06* (2006.01)
(Continued)

(52) U.S. Cl.
CPC ........... *H04B 7/088* (2013.01); *H04B 7/0632* (2013.01); *H04W 36/06* (2013.01); *H04W 36/36* (2013.01); *H04W 36/30* (2013.01); *H04W 36/32* (2013.01)

(58) Field of Classification Search
CPC .... H04B 7/088; H04B 7/0632; H04B 17/327; H04W 36/06; H04W 36/36; H04W 36/30; H04W 36/32; H04W 52/143
See application file for complete search history.

(56) References Cited

U.S. PATENT DOCUMENTS 10,091,759 B2  10/2018 Lin
10,224,994 B2   3/2019 Agiwal
(Continued)

FOREIGN PATENT DOCUMENTS

CN  106255209  12/2016
CN  108307413   7/2018
(Continued)

OTHER PUBLICATIONS

Office Action for CN Patent Application No. 202010029157.2; 13 pages; dated Dec. 30, 2022.
(Continued)

*Primary Examiner* — Vineeta S Panwalkar
(74) *Attorney, Agent, or Firm* — Kowert, Hood, Munyon, Rankin & Goetzel, P.C.

(57) ABSTRACT

Apparatuses, systems, and methods for a wireless device to perform methods to implement mechanisms for a UE to request a beam quality measurement procedure. A user equipment device may be configured to perform a method including performing transmitting a request to perform a beam quality measurement procedure for downlink receptions (e.g., a P3 procedure) to a base station/network entity, receiving instructions to perform the beam quality measurement procedure from the base station, and transmitting results of the beam quality measurement procedure to the base station. In some embodiments, transmission of the request may be response to at least one trigger condition and/or detection of a condition at the UE. The request may include an indication of a preferred timing offset. The
(Continued)

instructions to perform the beam quality measurement procedure may include a schedule for the beam quality measurement.

20 Claims, 14 Drawing Sheets

Related U.S. Application Data continuation of application No. 16/736,557, filed on Jan. 7, 2020, now Pat. No. 10,951,301.

(60) Provisional application No. 62/790,536, filed on Jan. 10, 2019.

(51) Int. Cl.
*H04W 36/06* (2009.01)
*H04W 36/36* (2009.01)
*H04W 36/30* (2009.01)
*H04W 36/32* (2009.01)

(56) References Cited

U.S. PATENT DOCUMENTS

| | | | |
|---|---|---|---|
| 10,284,315 B2 | 5/2019 | Reial | |
| 10,285,162 B2 | 5/2019 | Jung | |
| 10,367,677 B2 | 7/2019 | Parkvall | |
| 10,369,620 B2 | 8/2019 | Jacobs | |
| 11,206,549 B1 | 12/2021 | Eyuboglu | |
| 2002/0168944 A1 | 11/2002 | Terry et al. | |
| 2007/0097914 A1 | 5/2007 | Grilli et al. | |
| 2009/0168736 A1 | 7/2009 | Itagaki et al. | |
| 2016/0302233 A1 | 10/2016 | Gopala Krishnan et al. | |
| 2017/0006593 A1 | 1/2017 | Liu | |
| 2019/0081689 A1 | 3/2019 | Yu et al. | |
| 2019/0116605 A1 | 4/2019 | Luo et al. | |
| 2019/0159100 A1 | 5/2019 | Liou et al. | |
| 2019/0253108 A1 | 8/2019 | Zhang et al. | |

FOREIGN PATENT DOCUMENTS

| | | |
|---|---|---|
| CN | 109076548 | 12/2018 |
| CN | 109219972 | 1/2019 |
| WO | 2018201457 | 11/2018 |
| WO | WO 2018/230862 A | 12/2018 |

OTHER PUBLICATIONS

Ericsson "Feature lead summary 2 on beam measurement and reporting"; 3GPP TSG RAN WG1 Meeting #92 R1-1803346; Ahtens, Greece; 23 pages; Feb. 26, 2018.

Interdigital "Remaining issues on beam management"; 3GPP TSG RAN WG1 Meeting #91 R1-1720630; Reno, USA; 13 pages; Nov. 27, 2017.

Apple Inc "Consideration on beam measurement and reporting enhancement"; 3GPP TSG RAN WG1 Meeting #95 R1-1812921; 8 pages; Nov. 12, 2018.

5G NEW RADIO BEAM REFINEMENT PROCEDURE

PRIORITY DATA

This application is a continuation of U.S. patent application Ser. No. 17/202,185, titled "5G New Radio Beam Refinement Procedure", filed Mar. 15, 2021, now U.S. Pat. No. 11,405,095, which is a continuation of U.S. patent application Ser. No. 16/736,557, titled "5G New Radio Beam Refinement Procedure", filed Jan. 7, 2020, now U.S. Pat. No. 10,951,301, and which claims benefit of priority to U.S. Provisional Application Ser. No. 62/790,536, titled "5G New Radio Beam Refinement Procedure", filed Jan. 10, 2019, each of which is hereby incorporated by reference in its entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

FIELD

The present application relates to wireless devices, and more particularly to apparatus, systems, and methods for a wireless device to initiate beam management procedures for next generation radio access technologies.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Thus, improvements in the field are desired.

SUMMARY

Embodiments relate to apparatuses, systems, and methods to perform beam management procedures of a wireless device and a next generation network node (e.g., a fifth generation new radio (5G NR) network node also called a gNB).

The techniques described herein may be implemented in and/or used with a number of different types of devices, including but not limited to cellular phones, tablet computers, wearable computing devices, portable media players, and any of various other computing devices.

In some embodiments, a user equipment device may be configured to perform a method including performing transmitting a request to perform a beam quality measurement procedure for downlink receptions (e.g., a P3 procedure) to a base station/network entity, receiving instructions to perform the beam quality measurement procedure from the base station, and transmitting results of the beam quality measurement procedure to the base station. In some embodiments, transmission of the request may be response to at least one trigger condition and/or detection of a condition at the UE. In some embodiments, the request may be transmitted via one of physical uplink control channel (PUCCH) transmission or a medium access control (MAC) control element (CE) and may be indicated via a bit included in one of the PUCCH transmission or MAC CE. In some embodiments, the request may include an indication of a preferred timing offset. In some embodiments, the instructions to perform the beam quality measurement procedure may include a schedule for the beam quality measurement. In some embodiments, the request may include an indication that the UE supports concurrent reception of multiple beams.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
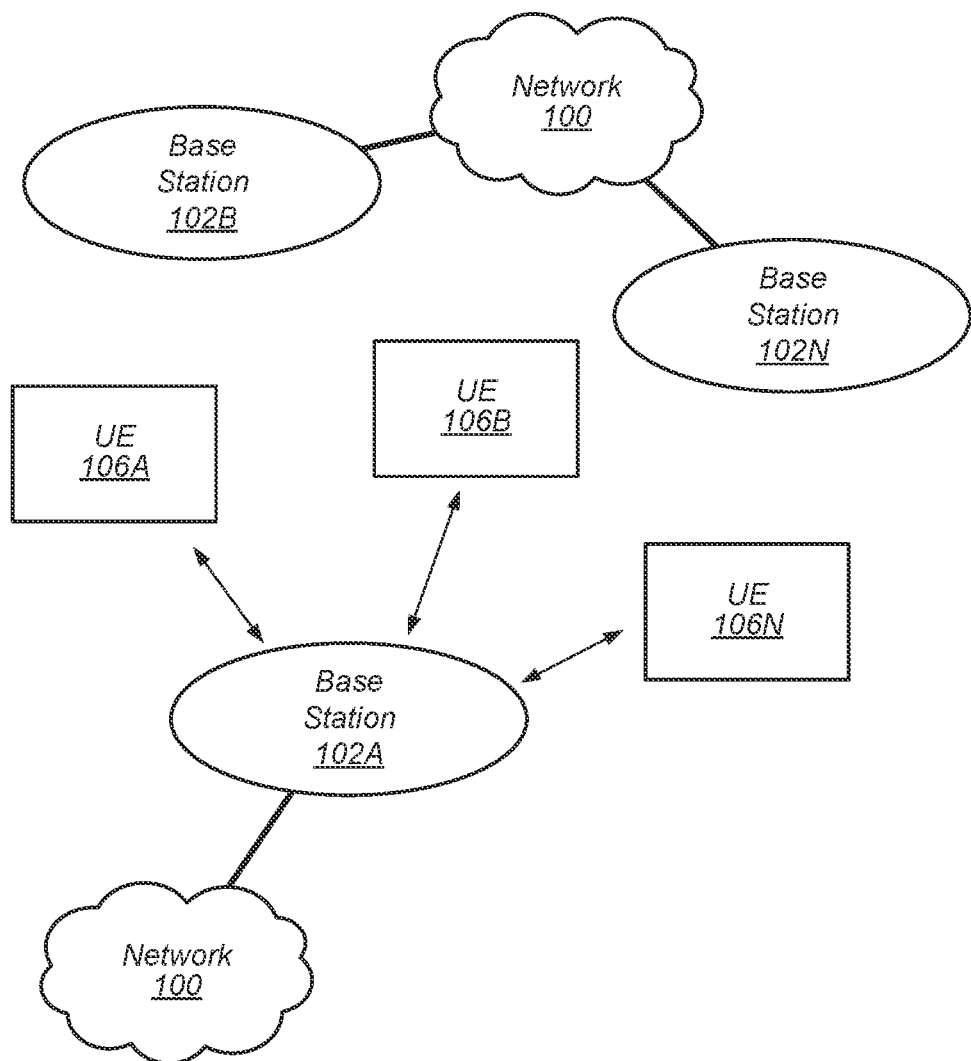
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
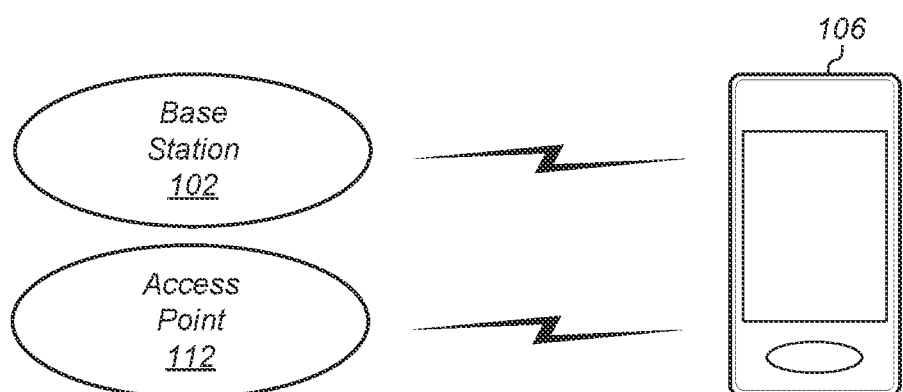
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), eLTE, 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, eLTE, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, eLTE, or 5G NR using a single shared radio and/or GSM, LTE, LTE-Advanced, eLTE or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE/eLTE or 5G NR (or LTE or 1×RTT or LTE or GSM), and separate radios for communicating using each of Wi-Fi and Bluetooth. Other configurations are also possible.

Figure 2:
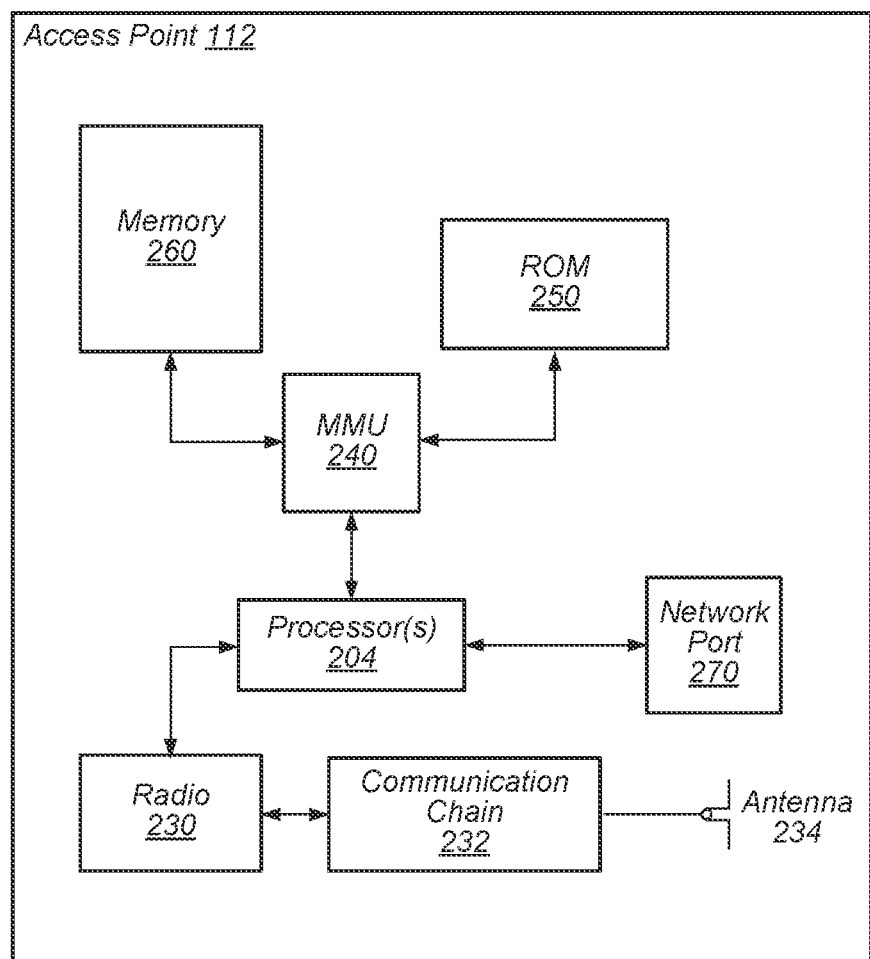
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), eLTE, Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies. In some embodiments, as further described herein, the AP 112 may include hardware and software components for implementing or supporting implementation of features described herein.

Figure 3:
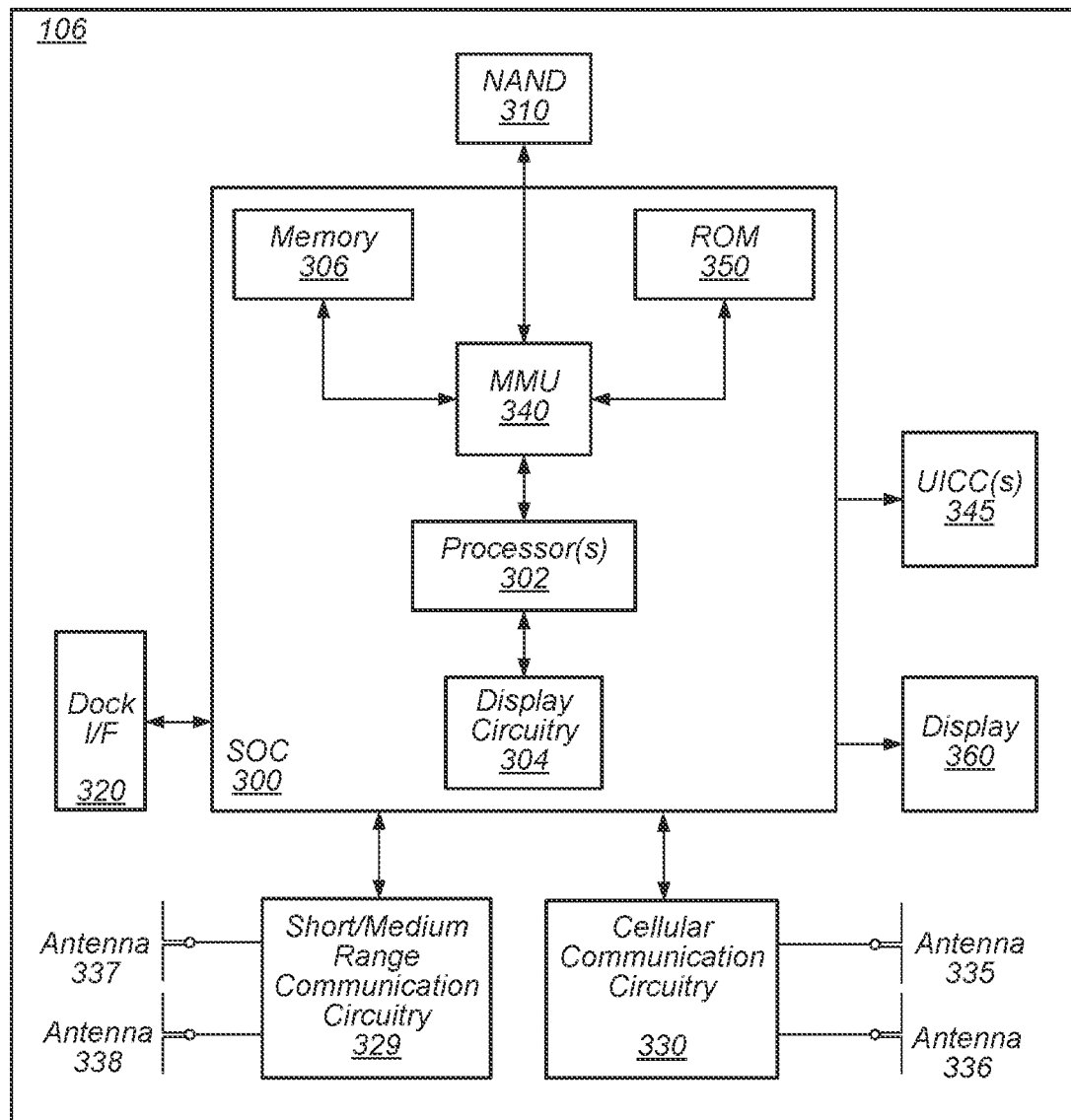
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector OF 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5GNR, eLTE, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE/eLTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE/eLTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector OF 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods to improve dual-registration in a 5G NR network, including notification procedure enhancements, dual-registration enhancements, and paging enhancements as further described herein.

As described herein, the communication device 106 may include hardware and software components for implementing the above features for a communication device 106. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short-range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short-range wireless communication circuitry 329 may include one or more ICs that are configured to perform the functions of short-range wireless communication circuitry 32. In addition, each integrated circuit may include circuitry (e.g., first circuitry, second circuitry, etc.) configured to perform the functions of short-range wireless communication circuitry 329.

Figure 4:
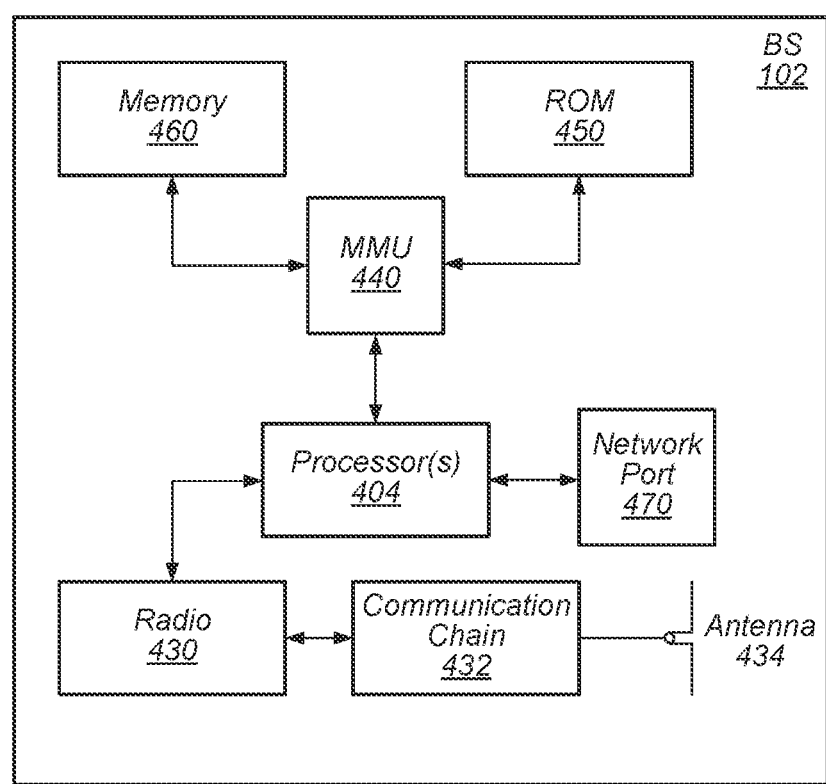
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, eLTE, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
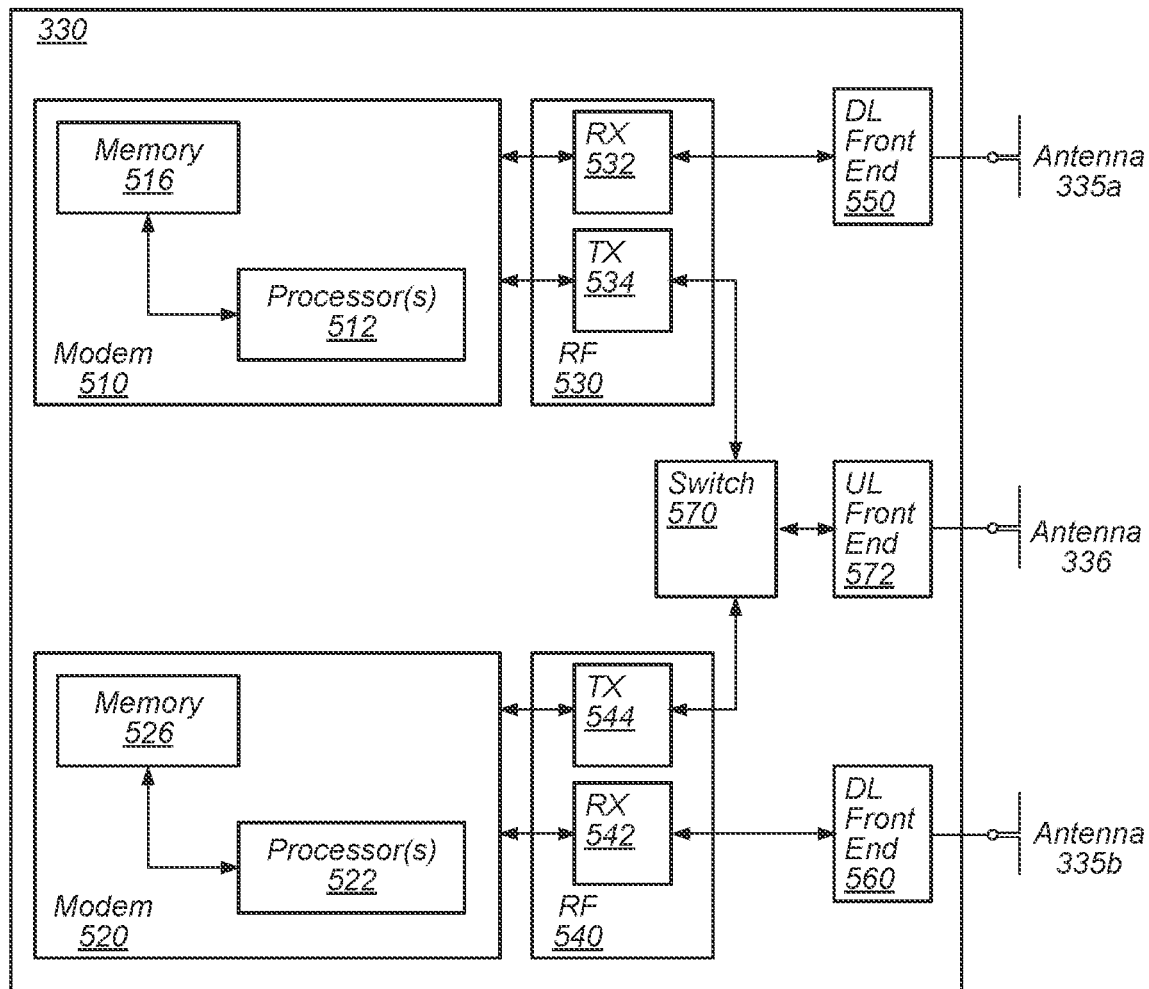
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as eLTE, LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, as described herein, the cellular communication circuitry 330 may include hardware and software components for implementing or supporting implementation of features described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

In some embodiments, as described herein, the modem 520 may include hardware and software components for implementing or supporting implementation of features described herein. Additionally, the processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
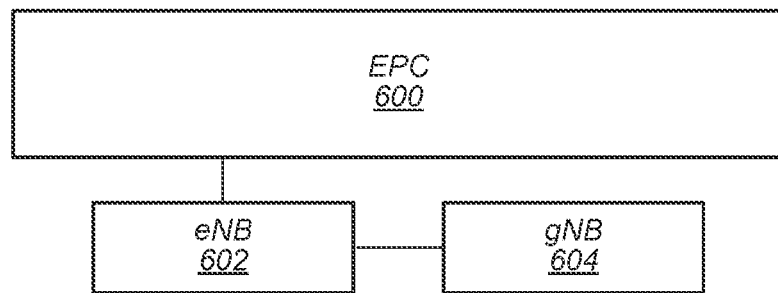
FIG. 6A illustrates an example of connections between an EPC network, an LTE base station (eNB), and a 5G NR base station (gNB).
Figure 6B:
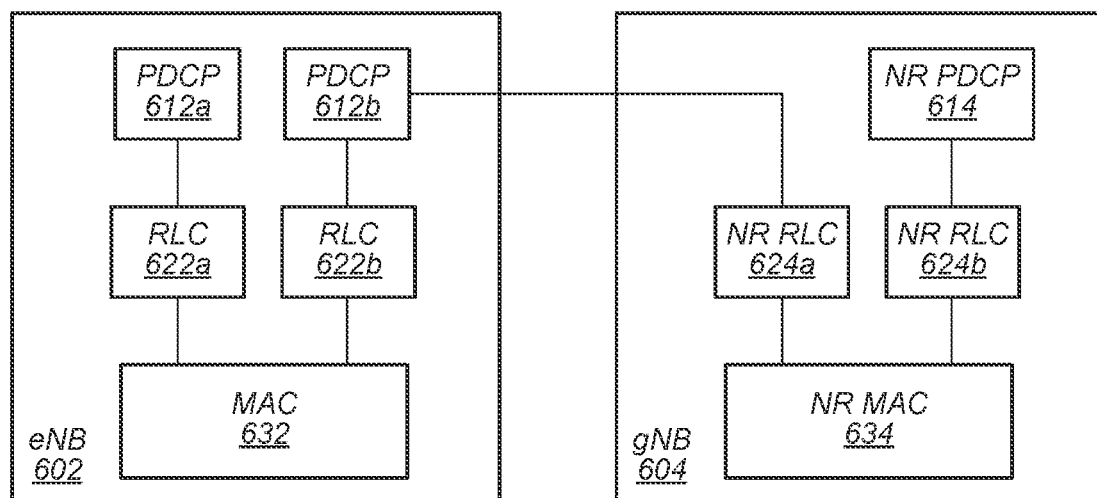
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602) and/or an evolution of an LTE base station (e.g., an eLTE eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE/eLTE may be used for control plane signaling and NR may be used for user plane signaling. Thus, LTE/eLTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622*a-b*. RLC layer 622*a* may also interface with packet data convergence protocol (PDCP) layer 612*a* and RLC layer 622*b* may interface with PDCP layer 612*b*. Similar to dual connectivity as specified in LTE-Advanced Release 12, PDCP layer 612*a* may interface via a master cell group (MCG) bearer to EPC network 600 whereas PDCP layer 612*b* may interface via a split bearer with EPC network 600.

Additionally, as shown, gNB 604 may include a MAC layer 634 that interfaces with RLC layers 624*a-b*. RLC layer 624*a* may interface with PDCP layer 612*b* of eNB 602 via an X2 interface for information exchange and/or coordination (e.g., scheduling of a UE) between eNB 602 and gNB 604. In addition, RLC layer 624*b* may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
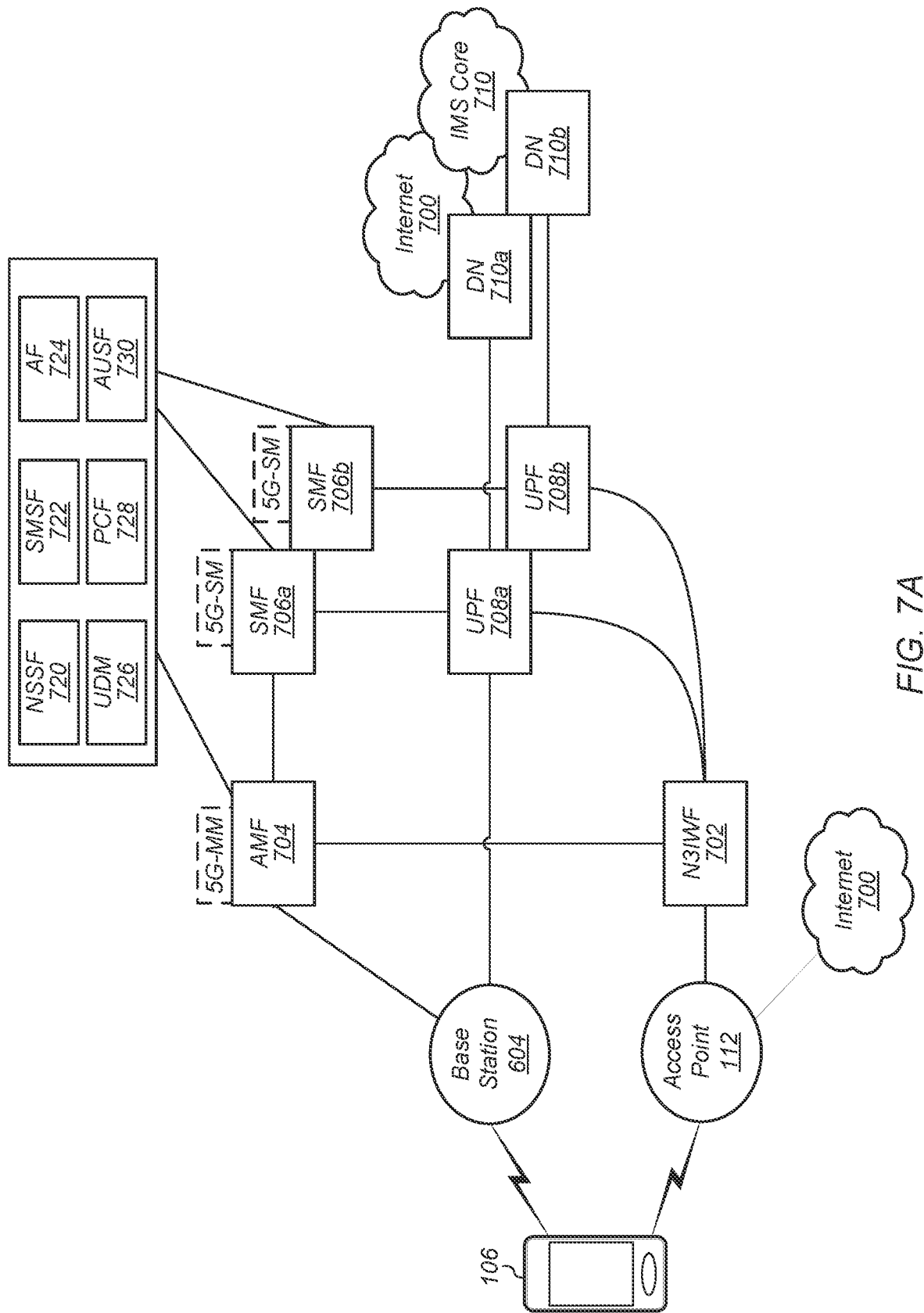
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Figure 7B:
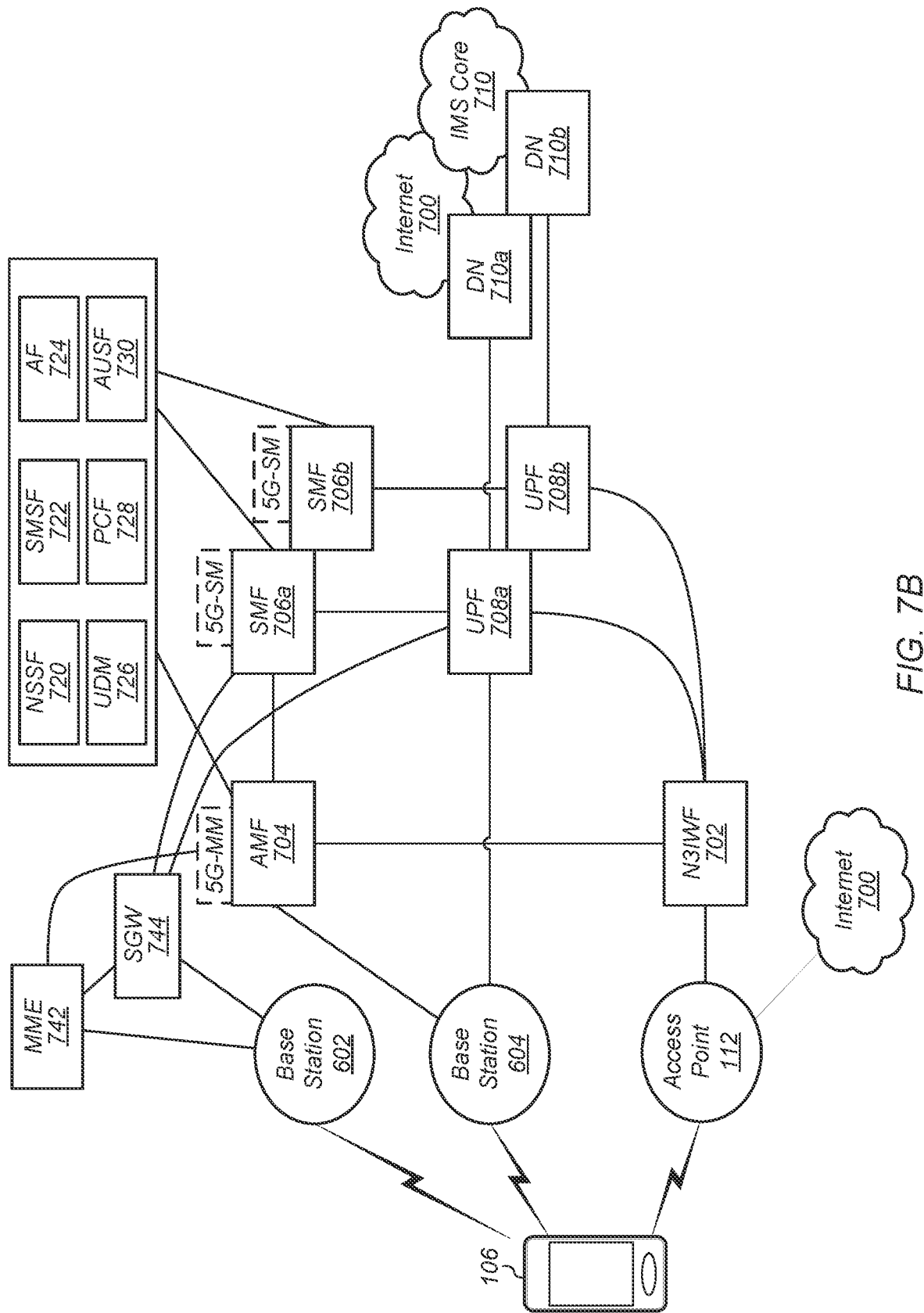
FIG. 7B illustrates an example of a 5G network architecture that incorporates both dual 3GPP (e.g., LTE/eLTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706a and the SMF 706b of the 5G CN. The AMF 706 may be connected to (or in communication with) the SMF 706a. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may include hardware and software components for implementing or supporting implementation of features described herein.

Figure 8:
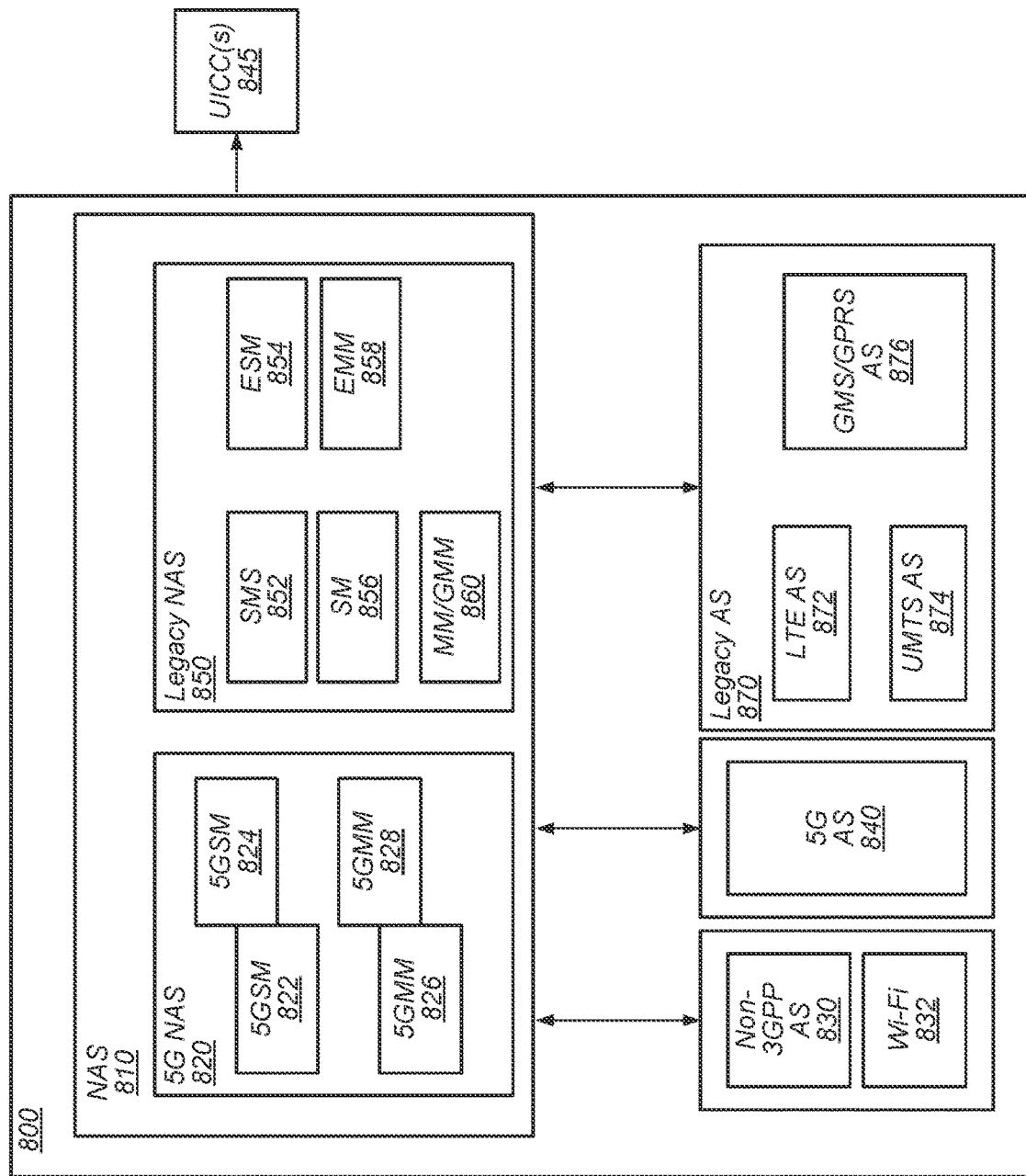
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may include hardware and software components for implementing or supporting implementation of features described herein.

Beam Management

In current implementations of the 5G New Radio (5G NR), the beam management framework includes a new radio base station (e.g., a "gNB") transmitting periodic beam management channel state information (CSI) to a user equipment device ("UE") and the UE measuring and reporting reference signal received power (RSRP) of selected beams. The gNB may monitor any beam degradation and trigger various beam management procedures, e.g., reselection of a beam at the gNB and/or reselection of a beam at the UE.

Figure 9:
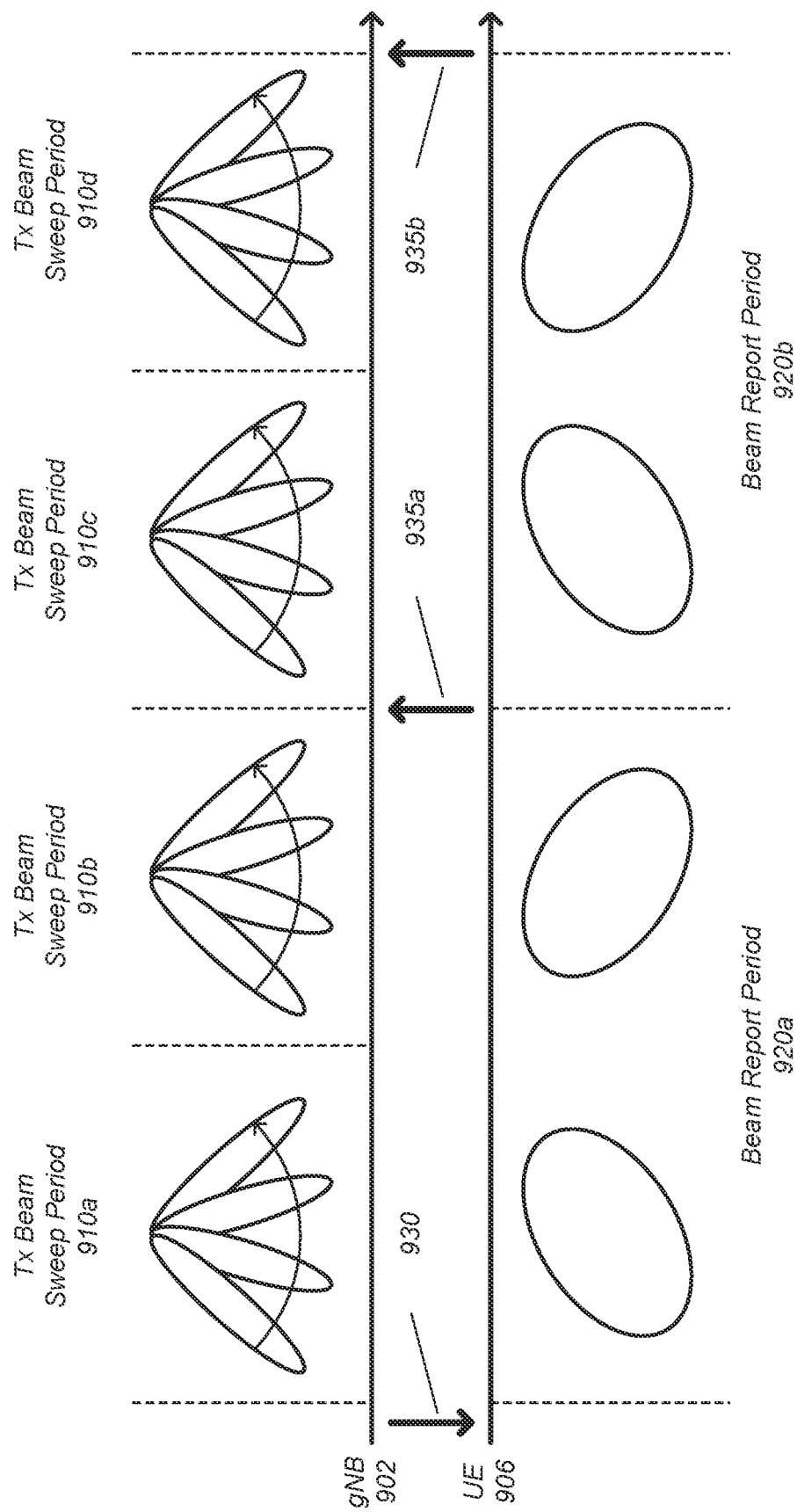
FIG. 9 illustrates an example of operation of a beam management framework.

For example, FIG. 9 illustrates an example of operation of a beam management framework. As shown, a gNB 902 may periodically or routinely transmit beam management channel state information (CSI) to a user equipment device, such as UE 906. Beam management CSI may include reference signals (RS) such as periodic CSI-RS (P-CSI-RS), semi-persistent CSI-RS (SP-CSI-RS), and/or synchronization signal blocks (SSBs), among other types of reference symbols. The UE 906 may monitor/measure the RSRP of the beam(s) and may report the RSRP to the gNB 902. The gNB 902 may monitor beam degradation, e.g., based on the reported RSRP and based on detecting beam degradation, the gNB 902 may trigger beam management procedures, including aperiodic beam management procedures (such as P2/P3, discussed below). In some instances, the beam management procedures may be triggered if beam management CSI is not sufficient to avoid degradation (e.g., beyond a threshold). Such aperiodic beam management procedures may be UE-specific, e.g., in order to avoid the potentially extensive resource cost of doing so for UEs generally. As illustrated by FIG. 9, during an exemplary beam management procedure, the gNB 902 may transmit a series of beams (e.g., Tx beam) in a sweep (or a series of sweeps), such as TX beam sweep periods 910a-d, and may transmit RRC configuration information 930 relevant to beam management. The UE 906 may detect one or more of the beams, may measure the strength (e.g., RSRP) or other characteristics of the beam(s), and may provide one or more reports 935a-b to the gNB 902 based on the detection(s) and/or measurement(s).

Figure 10A:
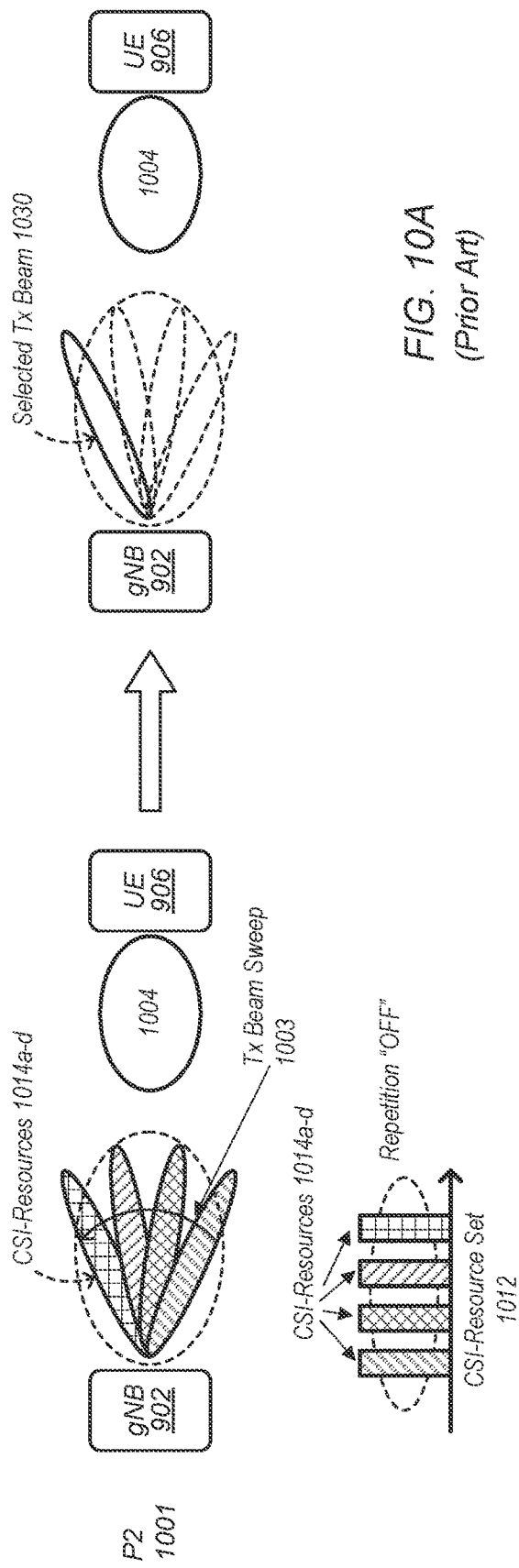
FIG. 10A illustrates an example of a P2 beam management procedure.
Figure 10B:
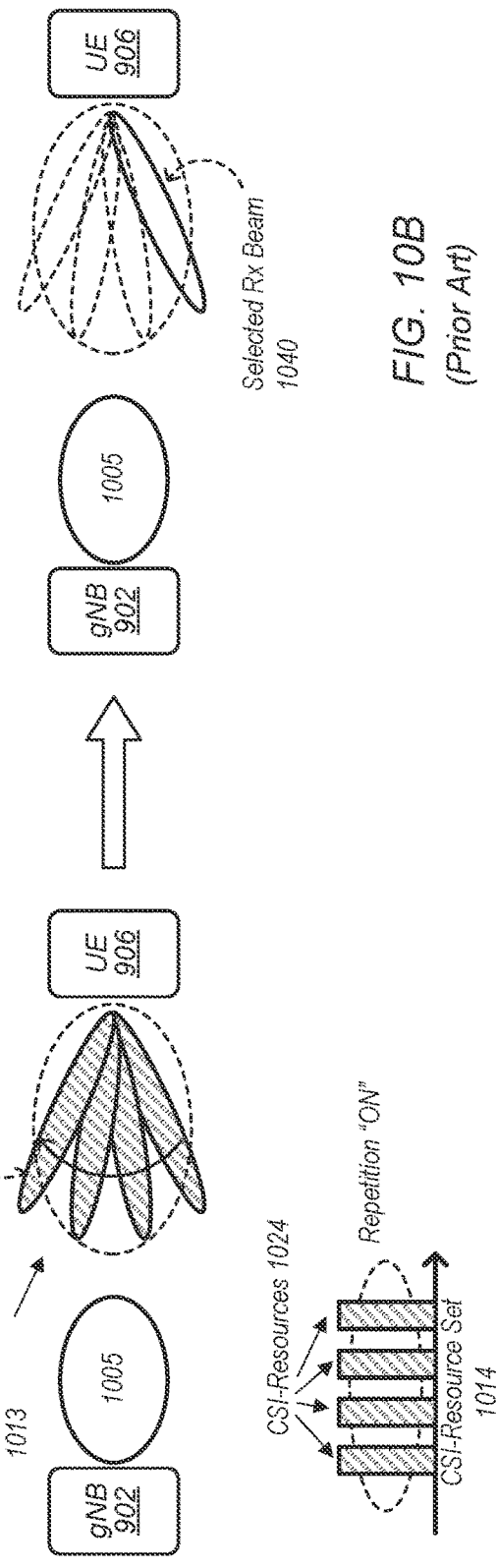
FIG. 10B illustrates an example of a P3 beam management procedure.

As a further example, FIGS. 10A-B illustrate respective beam management procedures, known as P2 and P3. Turning to FIG. 10A, a beam management procedure known as P2 includes a gNB, such as gNB 902, transmitting a series (e.g., a sweep) of beams 1003, e.g., narrow beams at different angles using a set of CSI resources 1014a-d (CSI resource set or CRS). As shown, a specific CSI resource may correspond to each beam so that each beam uses a different CSI resource, so that the total group of beams uses a specific CRS. For example, a CRS resource set 1012 including four resources 1014a-d may be used for P2, such that a different resource is used for each of four beams. In other words, the CRS may not be repeated, e.g., repetition is off. A receiving UE 906 may use a single, broad receive (e.g., Rx) beam 1004 during the sweep. Based on reports provided by the UE 906, the gNB 902 may select a Tx beam 1030.

Turning to FIG. 10B, in contrast to P2, a beam management procedure known as P3 includes a UE, such as UE 906, performing a sweep of Rx beams 1013 while the gNB 902 transmits a constant Tx beam 1005. The gNB 902 may use a single CSI resource set during the sweep 1013, e.g., repetition may be on. The CRS may include a single resource 1024, or multiple resources (e.g., in some instances, the CRS used for P3 may include five resources). Based on the measurements (e.g., RSRP) of the Tx beam 1005 using the different Rx beams, the UE may select an Rx beam 1040.

It will be appreciated that other, e.g., not illustrated herein, beam management procedures are known, including at least P1, U1, U2, and U3. P1 may include concurrent sweeps of both the gNB (e.g., Tx beam) and UE (e.g., Rx). U1, U2, and U3 may correspond to the P1, P2, and P3 procedures, except that the roles may be reversed, e.g., the UE may transmit a Tx beam and the gNB may receive with an Rx beam.

Figure 11A:
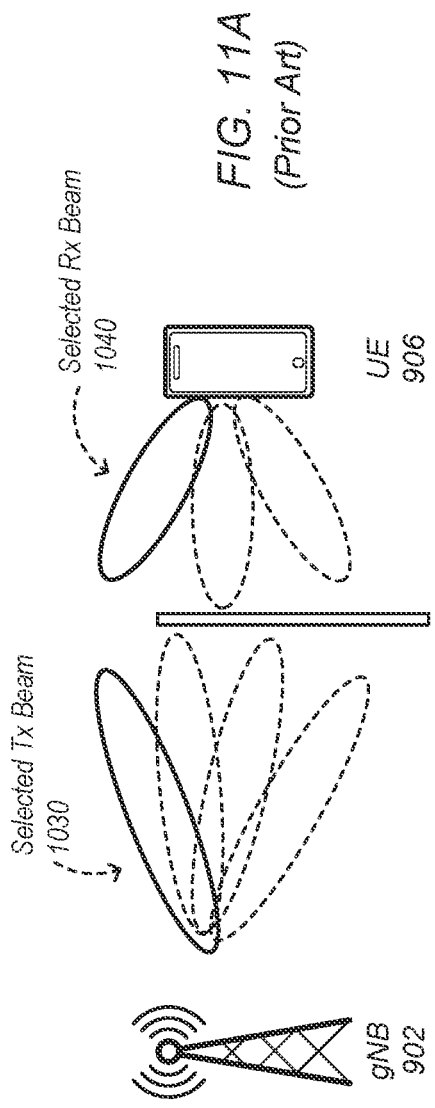
FIGS. 11A and 11B illustrate an example of effects of motion of a UE on beam selection.
Figure 11B:
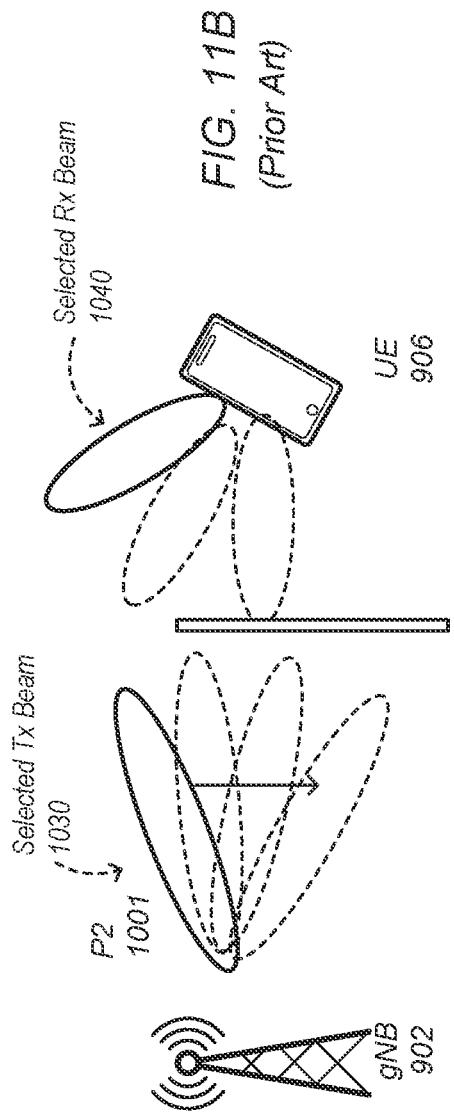

In addition to general signal degradation requiring beam management procedures, motion of a UE may impact beam quality and/or beam selection. FIGS. 11A and 11B illustrate an example of effects of motion of a UE on beam selection. For example, as illustrated by FIG. 11A, the UE 906 and the gNB 902 may use a first pair of Tx and Rx beams 1030 and 1040, respectively, while the UE 906 is in a first location or orientation. The first pair may result in good channel quality (e.g., high RSRP) given the communication environment.

As shown, the selected beams may avoid certain obstacles and may include reflection from objects to achieve a communicative path. Turning to FIG. 11B, illustrated is an instance in which the UE 906 may have moved or rotated and, as a result, the first pair of Tx and Rx beams 1030 and 1040 may no longer result in good channel quality. The change in the UE 906's position or orientation relative to the communication environment may lead to degradation of the channel when using the first pair of Tx and Rx beams 1030 and 1040. Thus, based on the motion of the UE, selection of a new pair of beams may be desirable.

Various observations may be appreciated. The behavior of a base station (e.g., eNB or gNB) may be predictable to a UE. For example, a gNB may transmit SSB and/or CSI on a known (e.g., periodic) schedule. Changes in a desirable beam (e.g., pair of Tx and Rx beams) may result from changes at the UE, such as movement, rotation, or blockage (e.g., a user's hand or body, or other surrounding objects), etc. The UE may thus know better than a gNB what actions may be taken to mitigate such changes. For example, the UE may use radio measurements and/or other sensors (e.g., accelerometers, GNSS circuitry) to detect changes that may implicate selection of a new beam pair. The gNB, in contrast, may only be able to detect degradation, and not the factors leading to the degradation. Thus, the UE may be better able to determine the cause of degradation and select an appropriate response. However, as shown, current beam management approaches may not support signaling/reporting from a UE to assist beam management procedures (e.g., to initiate P2 vs P3). Accordingly, the gNB 902 may rely on trial and error selection of beam management procedures, which may incur costs of power, resources, and delay. For example, in the case of a UE in rotation as illustrated in FIGS. 11A-B, the gNB 902 may detect RSRP drop (e.g., from a report from the UE 906) and may trigger a P2 beam management procedure 1001, although P3 may provide better likelihood of rapidly selecting an appropriate beam pair.

Thus, as popularity of beam forming in the development of 5G NR has increased, UE feedback of beam quality has become of increasing interest. In particular, periodic beam quality reports from the UE have been agreed upon for up to a maximum number of signaled beams. However, for a periodic beam reporting scheme, traffic overhead and link reliability benefits may need to be balanced, including, for example, adjustment of report periodicity and/or measurement periodicity as well as perhaps channel state information-reference signal (CSI-RS) periodicity. In addition, for an event-based measurement reporting scheme, which has been shown to effectively maintain good mobility service for LTE/UMTS, a faster event report and action may be required as compared to LTE/UMTS due to the scale of measurement is smaller for beams.

In particular, in a P3 procedure, the gNB transmits CSI-RS with repetition factor on and the UE autonomously refines its Rx beam. However, if repetition CSI-RS is transmitted concurrently with downlink (DL) data and if the UE switches to sub-optimal Rx beams, the DL data reception may potentially be impacted. Hence, it may not be desirable to transmit repetition CSI-RS and DL data concurrently unlike P1/P2 non-repetition CSI-RS, which can be transmitted concurrently with DL data without any issue. Additionally, in terms of repetition CSI-RS configuration, it may not make sense for gNB to configure the repetition of CSI-RS periodically. For example, if the periodicity is too short, the periodicity may introduce significant overhead and impact UE throughput efficiency, particularly when considering that repetition CSI-RS cannot be concurrent with DL data. As another example, if the periodicity is too long, the periodicity may cause beam failure and significantly impact UE throughput. In short, the gNB cannot determine what would be an optimal periodicity. As illustrated above, there can be a static scenario where P3 is not required at all, however, there can also be other scenarios where UE has to constantly refine its beams. Additionally, gNB initiated aperiodic P3 procedures may introduce other issues. Information regarding UE beam quality on the gNB side is limited (e.g., UE beam report, UL Rx metrics), thus it is difficult for gNB to define a trigger condition to trigger P3, but not P2. Further, when P3 is triggered by the gNB, it is likely that the UE Rx beam quality is noticeably worse and thus, it may be too late to trigger a UE beam refinement procedure (P3) without impact to downlink performance.

Embodiments described herein provide mechanisms to allow a UE, such as UE 106, to request a P3 beam refinement procedure. Such mechanisms benefit from the UE's global view of downlink (DL) beam quality as well as the UE's local side information on position and dynamics of UE movement (e.g., from proximity and motion sensor). Further, such mechanisms may allow the UE to have additional reasons to request P3 even in very good channel conditions (e.g., for power saving purposes, probe different Rx beams with different power consumption) which may not even relate to a particular event. In some embodiments, a UE may request a P3 procedure only as necessary which may:

(1) allow efficient utilization of repetition CSI-RS resources and minimize the CSI-RS overhead; and
(2) provide minimal incentive for the UE to abuse P3 procedure requests since the UE cannot benefit by receiving more physical resources and/or improved throughput efficiency.

Additionally, once a P3 procedure is properly handled by the UE, a gNB, such as gNB 604/base station 102, may have a clearer view on whether to initiate a P2 procedure. Thus, based on gNB side information, the gNB may make an improved decision on when and how often to trigger P2 procedures, thereby leading to an improvement in overall system efficiency.

In some embodiments, a UE, such as UE 106, may transmit (send) a request for a P3 procedure to a base station, such as gNB 604 and/or base station 102. In some embodiments, the request may be similar to a scheduling request. For example, in some embodiments, the request may be included as an additional bit in a physical uplink control channel (PUCCH) transmission and/or as an additional bit in a medium access control (MAC) control element (CE). Note that, given the dynamic nature of such a request, it may be more advantageous to use a PUCCH transmission to convey the request to base station. In some embodiments, upon receiving the request, the base station may trigger aperiodic repetition CSI-RS to fulfill the UE's request. However, the base station may have final decision on whether or not to honor/respond to the UE's request. In such embodiments, a base station may configure:

(1) periodic non-repetition CSI-RS to facilitate standard P2 procedures;
(2) aperiodic non-repetition CSI-RS (triggered by the base station) for emergent P2 as necessary; and/or
(3) aperiodic repetition CSI-RS (triggered by the UE) for P3 as necessary.

Figure 12A:
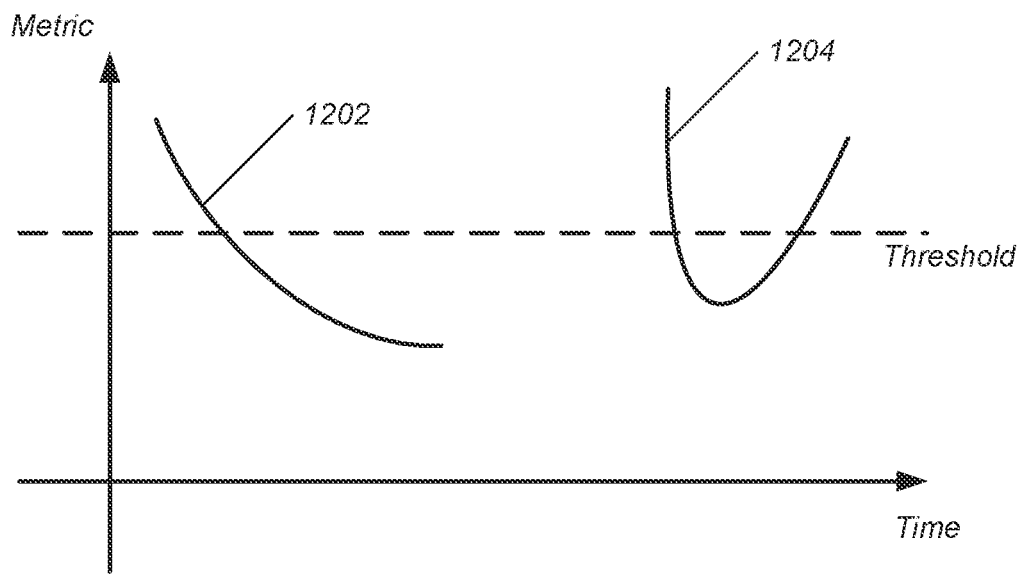
FIG. 12A illustrates an example of a signal quality metric triggering a P3 procedure, according to some embodiments.

In some embodiments, the network (e.g., a base station such as gNB 604 and/or base station 102) may regulate behavior of a UE, such as UE 106, regarding P3 triggering requests. In some embodiments, triggering requests and/or triggering conditions may be defined by standard. In some embodiments, the UE may trigger a P3 request based on a signal quality metric (e.g., reference signal received power (RSRP), channel quality indicator (CQI), and so forth) dropping below a pre-configured (e.g., standards specified) threshold. In some embodiments, the threshold may be signaled via RRC layer signaling. In addition, in some embodiments, a time to trigger may be added to the threshold, e.g., to reduce overhead. In other words, a time to trigger may be defined such that a UE may only trigger a P3 request if a signal quality metric consistently falls below a threshold for a configured period of time. For example, as illustrated by FIG. 12A, a signal quality metric may be required to remain below a threshold for a period of time (as shown by metric curve 1202) in order for the UE to trigger a P3 request. In contrast, as shown by metric curve 1204, if the signal quality metric 1204 does not remain below the threshold for the period of time, then the UE may not trigger a P3 request. In some embodiments, in addition to consideration of a duration of time the metric remaining below the threshold, the UE may also consider time rate of change of the signal quality metric as a triggering condition. For example, if the UE determines that the metric has dropped below the threshold and, based on time rate of change of the metric, determines that the metric is continuing to decrease, the UE may trigger a P3 request. Conversely, if the UE determines that the metric has dropped below the threshold and, based on time rate of change of the metric, determines that the metric is increasing, the UE may not trigger a P3 request.

Figure 12B:
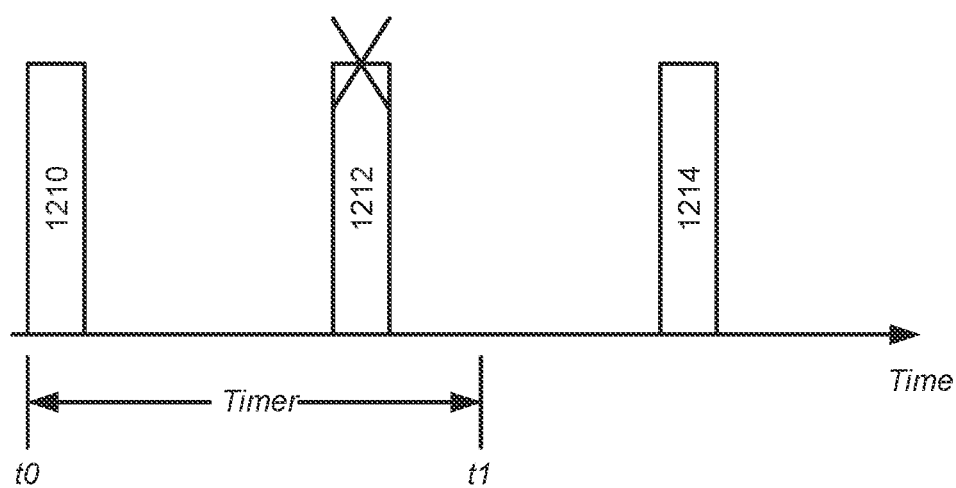
FIG. 12B illustrates an example of a prohibit timer dis-allowing triggering of a P3 procedure, according to some embodiments.

In some embodiments, a prohibit timer may be implemented to disallow a UE from triggering P3 requests too rapidly. For example, as illustrated by FIG. 12B, a UE, such as UE 106, may initially transmit a P3 request 1210 to a base station, such as gNB 604 and/or base station 102, at a time, to. Additionally, one or more of the UE or base station may initiate a timer with an expiration of the timer occurring at time ti. Thus, at a time prior to ti, the UE may attempt to send a P3 request 1212 to the base station. However, since the timer has not expired, the UE may suppress the P3 request 1212 and/or the base station may ignore and/or deny the P3 request 1212. Further, at a time after ti, e.g., after expiration of the timer, the UE may transmit a P3 request 1214. In addition, since the P3 request 1214 is after the expiration of the timer, the base station may honor the P3 request.

In some embodiments, regardless of signal quality metrics and/or prohibit timers, a UE, such as UE 106, may transmit a P3 request to a base station, such as gNB 604 and/or base station 102, in response to a condition at the UE. For example, if the UE detects a thermal issue (e.g., the UE is overheating), the UE may transmit a P3 request in an attempt to mitigate the thermal issue. As another example, the UE may detect a power issue (e.g., low battery level and/or rapid power drain) and may transmit a P3 request in an attempt to mitigate the power issue.

In some embodiments, a P3 request may include an indication of a preferred timing offset for aperiodic CSI-RS. Note that 5G NR standards define a timing offset to accommodate delays needed to switch radio frequency beams. For example, if a beam switch is intra-panel, an associated switching delay may be relatively short as compared to a beam switch that is inter-panel, for which an associated switching delay may be relatively long. Further, if a UE deactivates an antenna panel (e.g., for power saving purposes), beam switch to the deactivated panel may incur the longest delay (e.g., between 2 and 3 milliseconds). In some embodiments, the timing offset may be defined as between the aperiodic CSI-RS and measurement report, e.g., to accommodate DCI decoding, processing, and beam switching delay. In some embodiments, the UE may inform the network of a preferred category of timing offset for an aperiodic CSI-RS. In some embodiments, the preferred categories may account for different use cases, e.g., a first category may be associated with an intra-panel Rx beam sweep, a second category may be associated with an inter-panel Rx beam sweep, and/or a third category may be associated with an inter-panel Rx beam sweep to a deactivated panel.

As noted above, P3 UE CSI-RS monitoring using different Rx beams may affect downlink (DL) data reception if scheduled concurrently. In other words, there may be resource competition between CSI-RS and PDCCH/PDSCH during a P3 procedure. In some embodiments, a base station, such as gNB 604 and/or base station 102, may avoid scheduling PDCCH and/or PDSCH for a UE, such as UE 106, in a transmit time interval (TTI) in which the UE is scheduled for repetition CSI-RS (e.g., a P3 procedure). In some embodiments, such a scheme may significantly lower UE throughput efficiency, especially if P3 procedures are scheduled frequently. Additionally, when a UE switches to a different Rx beam, it does not necessarily follow that the UE cannot decode PDCCH and/or PDSCH.

Hence, in some embodiments, since PDCCH carries more critical control information on uplink and downlink, repetition CSI-RS may be scheduled non-concurrent with PDCCH region. In other words, in some embodiments, a base station, such as gNB 604 and/or base station 102, may avoid scheduling PDCCH for a UE, such as UE 106, in a transmit time interval (TTI) in which the UE is scheduled for repetition CSI-RS (e.g., a P3 procedure). Thus, in some embodiments, PDSCH may overlap with a P3 procedure. Further, in cases of PDSCH CRC failure, HARQ retransmissions may be used to recover the failed CBG(s).

In some embodiments, when a P3 procedure (repetition CSI-RS) is scheduled in a TTI with PDSCH (e.g., scheduled concurrently with PDSCH), CSI-RS symbols associated with the P3 procedure may be assigned at the end of the TTI (e.g., time slot). In addition, in some embodiments, the PDSCH may use a partial slot format such that PDCCH, PDSCH, and CSI-RS are time-multiplexed within the time slot. Hence, instead of causing the time slot to be completely unusable for data transmission, such a scheme may minimize the P3 procedure's impact on UE throughput. In addition, such a scheme may allow for P3 procedure scheduling of up to once per time slot (TTI).

In some embodiments, a UE panel of antennas may be able to generate multiple Rx beams concurrently (e.g., from a horizontal polarized antenna group and a vertical polarized antenna group of the panel). In such instances, the UE, e.g., such as UE 106, may be able to monitor data and repetition CSI-RS concurrently. Hence, in some embodiments, the UE may report and/or indicate a multi-beam capability to a base station, such as gNB 604 and/or base station 102. In some embodiments, the multi-beam capability may include both generation of two Rx beams concurrently from a single panel and/or processing of the two Rx beams separately (e.g., all the way down from RF reception to baseband processing, for example, one Rx beam for data decoding and one Rx beam for CSI-RS measurement). In other words, the multi-beam capability may indicate both the capability of generation of multiple Rx beams and the capability to process the Rx beams without combining across the Rx beams. In some embodiments, if such a capability is indicated as supported, the base station may schedule both data and repetition CSI-RS concurrently for the UE (e.g., within the same TTI). In some embodiments, the base station may only schedule CSI-RS concurrently with PDSCH (e.g., not concurrently with PDCCH) to maintain robustness in reception of PDCCH. In addition, in some embodiments, the base station may consider potential MIMO layer reduction during the concurrent scheduling, e.g., since one group of antennas may be occupied for CSI-RS monitoring.

Figure 13:
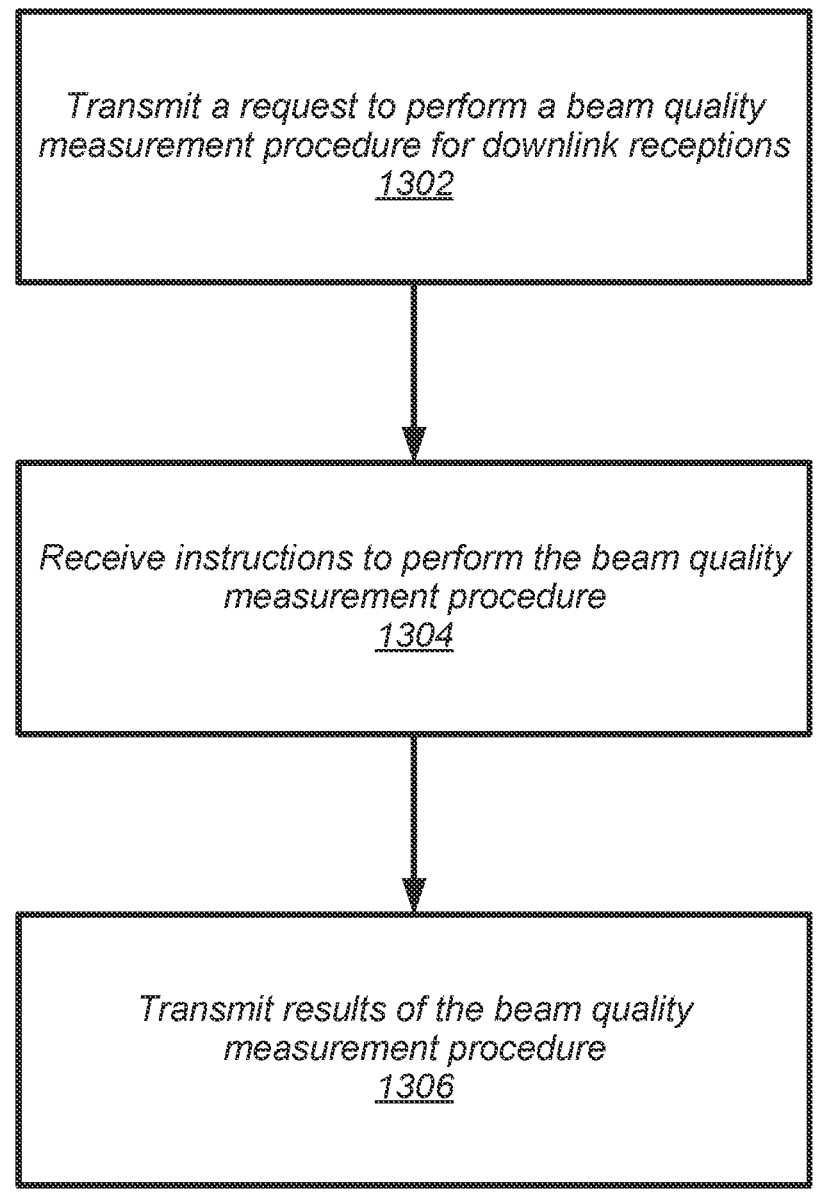
FIG. 13 illustrates a block diagram of an example of a method for a UE to request a beam quality measurement procedure, according to some embodiments.

FIG. 13 illustrates a block diagram of an example of a method for a UE to request a beam quality measurement procedure, according to some embodiments. The method shown in FIG. 13 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1302, a request to perform a beam quality measurement procedure for downlink receptions (e.g., a P3 procedure) may be transmitted from a UE, such as UE 106, to a base station/network entity, such as gNB 604 and/or base station 102. In some embodiments, transmission of the request may be response to at least one trigger condition and/or detection of a condition at the UE. In some embodiments, the trigger condition may include any, any combination of, or all of a position of the UE, a movement of the UE, a power condition of the UE, a thermal condition of the UE, expiration of a prohibit timer (or timer, e.g., as described herein) and/or a signal quality issue detected by the UE. In some embodiments, the signal quality issue may be detected by the UE based, at least in part, on a signal quality metric decreasing below a threshold associated with the signal quality metric. In some embodiments, the threshold may include a value associated with the signal quality metric and a minimum time below the value. In such embodiments, the signal quality issue may be detected by the UE further based, at least in part, on a signal quality metric decreasing below the threshold associated with the signal quality metric for the minimum time. In some embodiments, the threshold may be defined by a standard. In some embodiments, the minimum time may be defined by a standard. In some embodiments, the signal quality metric may include at least one of reference signal received power (RSRP) or channel quality indicator (CQI). In some embodiments, the threshold may be signaled to the UE via radio (RRC) resource control layer signaling.

In some embodiments, the request may be transmitted via one of physical uplink control channel (PUCCH) transmission or a medium access control (MAC) control element (CE). In some embodiments, the request may be indicated via a bit included in one of the PUCCH transmission or MAC CE.

In some embodiments, the request may include an indication of a preferred timing offset. In some embodiments, the indication of the preferred timing offset may specify a first timing offset category among a plurality of timing offset categories. In some embodiments, the plurality of timing offset categories may include any, any combination of, and/or all of a first category associated with an intra antenna panel receive beam sweep, a second category associated with an inter antenna panel receive beam sweep, and/or a third category associated with an inter antenna panel receive beam sweep to a deactivated antenna panel of the UE.

At 1304, instructions to perform the beam quality measurement procedure may be received by the UE from the base station. In some embodiments, the instructions to perform the beam quality measurement procedure may include a schedule for the beam quality measurement. In some embodiments, the schedule may indicate that the beam quality measurement procedure is not scheduled concurrently with at least one of physical downlink control channel (PDCCH) transmissions or physical downlink shared channel (PDSCH) transmissions. In some embodiments, the schedule may indicate that the beam quality measurement procedure is scheduled concurrently with physical downlink shared channel (PDSCH) transmissions. In such embodiments, symbols associated with the beam quality measurement procedure may be scheduled after the PDSCH transmissions within a transmit time interval (TTI). In some embodiments, the schedule may indicate that the beam quality measurement procedure, physical downlink control channel (PDCCH) transmissions, and physical downlink shared channel (PDSCH) transmissions are time-multiplexed within a transmit time interval (TTI).

In some embodiments, the request may include an indication that the UE supports concurrent reception of multiple beams. In such embodiments, the instructions to perform the beam quality measurement procedure may include a schedule for the beam quality measurement. Further, in some embodiments, the schedule may indicate that the beam quality measurement procedure will be performed concurrently with data reception.

At 1306, results of the beam quality measurement procedure may be transmitted from the UE to the base station.

In some embodiments, a timer may be initiated in response to transmitting the request to perform the beam quality measurement procedure. In such embodiments, the UE may wait until expiration of the timer to transmit a subsequent request to perform a subsequent beam quality measurement procedure. In some embodiments, the timer may be initiated by the base station and the base station may ignore any subsequent request to perform a subsequent beam quality measurement procedure received from the UE until after expiration of the timer. In some embodiments, a duration of the timer may be specified by the base station. In some embodiments, the duration of the timer may be further specified by a standard. In some embodiments, the UE may monitor a value of a signal quality metric (e.g., as described herein) in relation to a threshold during a duration of the timer. In such embodiments, the UE may reset the timer prior to expiration if (and/or when) the value of the signal quality metric exceeds the threshold.

FURTHER EMBODIMENTS

In some embodiments, a UE, such as UE may be configured to perform a method for requesting a beam management procedure, including transmitting, to a base station, such as base station 102, a request to perform a beam quality measurement procedure for downlink receptions, receiving, from the base station, instructions to perform the beam quality measurement procedure, and transmitting, to the base station, results of the beam quality measurement procedure.

In some embodiments, transmitting the request may be responsive to at least one trigger condition. In some embodiments, the trigger condition may be based, at least in part, on at least one of a position of the UE, a movement of the UE, a power condition of the UE, a thermal condition of the UE, and/or a signal quality issue detected by the UE. In some embodiments, the signal quality issue may be detected by the UE based, at least in part, on a signal quality metric decreasing below a threshold associated with the signal quality metric. In some embodiments, the threshold may be defined by a standard. In some embodiments, the threshold may include a value associated with the signal quality metric and a minimum time below the value. In some embodiments, the minimum time may be defined by a standard. In some embodiments, the signal quality issue may be detected by the UE further based, at least in part, on a signal quality metric decreasing below the threshold associated with the signal quality metric for the minimum time. In some embodiments, the signal quality metric may include at least one of reference signal received power (RSRP) and/or channel quality indicator (CQI). In some embodiments, the threshold may be signaled to the UE via radio (RRC) resource control layer signaling.

In some embodiments, the method may include the UE initiating a timer in response to transmitting the request to perform the beam quality measurement procedure and waiting, until expiration of the timer, to transmit a subsequent request to perform a subsequent beam quality measurement procedure. In some embodiments, a duration of the timer may be specified by the base station.

In some embodiments, transmitting the request to perform a beam quality measurement procedure may be in response to detection of a condition at the UE. In some embodiments, the condition may include at least one of a thermal condition and/or a power condition.

In some embodiments, the request to perform a beam quality measurement procedure may be transmitted via one of physical uplink control channel (PUCCH) transmission and/or a medium access control (MAC) control element (CE). In some embodiments, the request may be indicated via a bit included in one of the PUCCH transmission and/or the MAC CE.

In some embodiments, the request to perform a beam quality measurement procedure may include an indication of a preferred timing offset. In some embodiments, the indication of the preferred timing offset may specify a first timing offset category among a plurality of timing offset categories. In some embodiments, the plurality of timing offset categories may include one or more of a first category associated with an intra antenna panel receive beam sweep, a second category associated with an inter antenna panel receive beam sweep, and/or a third category associated with an inter antenna panel receive beam sweep to a deactivated antenna panel of the UE.

In some embodiments, the instructions to perform the beam quality measurement procedure may include a schedule for the beam quality measurement. In some embodiments, the schedule may indicate that the beam quality measurement procedure is not scheduled concurrently with at least one of physical downlink control channel (PDCCH) transmissions and/or physical downlink shared channel (PDSCH) transmissions. In some embodiments, the schedule may indicate that the beam quality measurement procedure is scheduled concurrently with physical downlink shared channel (PDSCH) transmissions. In such embodiments, symbols associated with the beam quality measurement procedure may be scheduled after the PDSCH transmissions within a transmit time interval (TTI). In some embodiments, the schedule may indicate that the beam quality measurement procedure, physical downlink control channel (PDCCH) transmissions, and physical downlink shared channel (PDSCH) transmissions are time-multiplexed within a transmit time interval (TTI).

In some embodiments, the request to perform a beam quality measurement procedure may include an indication that the UE supports concurrent reception of multiple beams. In some embodiments, the instructions to perform the beam quality measurement procedure may include a schedule for the beam quality measurement. In such embodiments, the schedule may indicate that the beam quality measurement procedure will be performed concurrently with data reception.

In some embodiments, a network entity, such as base station 102 and or gNB 604, may perform a method to aid a UE, such UE 106, in requesting a beam management procedure, including receiving, from a UE, a request to perform a beam quality measurement procedure for downlink receptions, transmitting, to the UE, instructions to perform the beam quality measurement procedure, and receiving, from the UE, results of the beam quality measurement procedure.

In some embodiments, transmitting the request may be responsive to at least one trigger condition. In some embodiments, the trigger condition may be based on at least one of a position of the UE, a movement of the UE, a power condition of the UE, a thermal condition of the UE, and/or a signal quality issue detected by the UE. In some embodiments, the signal quality issue may be detected by the UE based, at least in part, on a signal quality metric decreasing below a threshold associated with the signal quality metric. In some embodiments, the threshold may be defined by a standard. In some embodiments, the threshold may include a value associated with the signal quality metric and a minimum time below the value. In some embodiments, the minimum time may be defined by a standard. In some embodiments, the signal quality issue may be detected by the UE further based, at least in part, on a signal quality metric decreasing below the threshold associated with the signal quality metric for the minimum time. In some embodiments, the signal quality metric may include at least one of reference signal received power (RSRP) and/or channel quality indicator (CQI). In some embodiments, the threshold may be signaled to the UE via radio (RRC) resource control layer signaling.

In some embodiments, the method may further include the network entity initiating a timer in response to receiving the request to perform the beam quality measurement procedure, receiving, prior to expiration of the timer, a subsequent request to perform a subsequent beam quality measurement procedure, and ignoring the subsequent request. In some embodiments, a duration of the timer may be specified by the network entity.

In some embodiments, receiving the request to perform a beam quality measurement procedure may be in response to detection of a condition at the UE. In some embodiments, the condition may include at least one of a thermal condition and/or a power condition.

In some embodiments, the request may be received via one of physical uplink control channel (PUCCH) transmission or a medium access control (MAC) control element (CE). In some embodiments, the request may be indicated via a bit included in one of the PUCCH transmission and/or MAC CE.

In some embodiments, the request may include an indication of a preferred timing offset. In some embodiments, the indication of the preferred timing offset may specify a first timing offset category among a plurality of timing offset categories. In some embodiments, the plurality of timing offset categories may include one or more of a first category associated with an intra antenna panel receive beam sweep, a second category associated with an inter antenna panel receive beam sweep, and/or a third category associated with an inter antenna panel receive beam sweep to a deactivated antenna panel of the UE.

In some embodiments, the instructions to perform the beam quality measurement procedure may include a schedule for the beam quality measurement. In some embodiments, the schedule may indicate that the beam quality measurement procedure is not scheduled concurrently with at least one of physical downlink control channel (PDCCH) transmissions and/or physical downlink shared channel (PDSCH) transmissions. In such embodiments, the schedule may indicate that the beam quality measurement procedure is scheduled concurrently with physical downlink shared channel (PDSCH) transmissions and symbols associated with the beam quality measurement procedure may be scheduled after the PDSCH transmissions within a transmit time interval (TTI). In some embodiments, the schedule may indicate that the beam quality measurement procedure, physical downlink control channel (PDCCH) transmissions, and physical downlink shared channel (PDSCH) transmissions are time-multiplexed within a transmit time interval (TTI).

In some embodiments, the request may include an indication that the UE supports concurrent reception of multiple beams. In some embodiments, the instructions to perform the beam quality measurement procedure may include a schedule for the beam quality measurement. In such embodiments, the schedule may indicate that the beam quality measurement procedure will be performed concurrently with data reception.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A base station, comprising:
   at least one antenna;
   at least one radio coupled to the at least one antenna; and
   a processing element coupled to the at least one radio;
   wherein the processing element is configured to cause the base station to:
      receive, from a user equipment (UE), an indication of a timing offset, wherein the indication of the timing offset specifies a first timing offset category among a plurality of timing offset categories, and wherein the timing offset is between an aperiodic channel state information (CSI) reference signal (CSI-RS) and an associated measurement report;
      transmit, to the UE, instructions to perform a beam quality measurement procedure and report a result of the beam quality measurement procedure based on the indication; and
      receive, from the UE, the result of the beam quality measurement procedure.

2. The base station of claim 1,
   wherein the timing offset accommodates DCI decoding, processing, and beam switching delay.

3. The base station of claim 1,
   wherein the plurality of timing offset categories includes timing offset categories associated with one or more of an intra antenna panel receive beam sweep, an inter antenna panel receive beam sweep, or an inter antenna panel receive beam sweep to a deactivated antenna panel.

4. The base station of claim 1,
   wherein receiving the indication is responsive to at least one trigger condition, wherein the trigger condition is based, at least in part, on at least one of:
      a position of the UE;
      a movement of the UE;
      a power condition of the UE;
      a thermal condition of the UE; or
      a signal quality issue detected by the UE.

5. The base station of claim 4,
   wherein the signal quality issue is detected by the UE based, at least in part, on a signal quality metric decreasing below a threshold associated with the signal quality metric.

6. The base station of claim 5,
   wherein the threshold includes a value associated with the signal quality metric and a minimum time below the value.

7. The base station of claim 6,
   wherein the signal quality issue is detected by the UE further based, at least in part, on a signal quality metric decreasing below the threshold associated with the signal quality metric for the minimum time.

8. The base station of claim 1,
   wherein receiving the indication is in response to a detection, by the UE, of a condition at the UE, and wherein the condition includes at least one of a thermal condition, a power condition, or expiration of a prohibit timer.

9. The base station of claim 1,
   wherein the indication is received via one of physical uplink control channel (PUCCH) transmission or a medium access control (MAC) control element (CE).

10. An apparatus, comprising:
    a memory; and
    at least one processor in communication with the memory, wherein the at least one processor is configured to:
       receive, from a user equipment device (UE), an indication of a timing offset, wherein the indication of the timing offset specifies a first timing offset category among a plurality of timing offset categories, and wherein the timing offset is between an aperiodic channel state information (CSI) reference signal (CSI-RS) and an associated measurement report;
       generate instructions to transmit, to the UE, instructions to perform a beam quality measurement procedure and report a result of the beam quality measurement procedure based on the indication; and
       receive, from the UE, the result of the beam quality measurement procedure.

11. The apparatus of claim 10,
    wherein the timing offset accommodates DCI decoding, processing, and beam switching delay.

12. The apparatus of claim 10,
    wherein the plurality of timing offset categories includes timing offset categories associated with one or more of an intra antenna panel receive beam sweep, an inter antenna panel receive beam sweep, or an inter antenna panel receive beam sweep to a deactivated antenna panel.

13. The apparatus of claim 12,
    wherein receiving the indication is responsive to at least one trigger condition.

14. The apparatus of claim 13,
    wherein the trigger condition is based, at least in part, on at least one of:
       a position of the UE;
       a movement of the UE;
       a power condition of the UE;
       a thermal condition of the UE; or
       a signal quality issue detected by the UE.

15. The apparatus of claim 14,
    wherein the signal quality issue is detected by the UE based, at least in part, on a signal quality metric decreasing below a threshold associated with the signal quality metric, and wherein the threshold includes a value associated with the signal quality metric and a minimum time below the value.

16. A method for requesting a beam management procedure, comprising:
    a base station,
       receiving, from a user equipment device (UE), an indication of a timing offset, wherein the indication of the timing offset specifies a first timing offset category among a plurality of timing offset categories, and wherein the timing offset is between an aperiodic channel state information (CSI) reference signal (CSI-RS) and an associated measurement report;
       transmitting, to the UE, instructions to perform a beam quality measurement procedure and report a result of the beam quality measurement procedure based on the indication; and
       receiving, from the UE, the result of the beam quality measurement procedure.

17. The method of claim 16,
    wherein receiving the indication is responsive to at least one trigger condition, wherein the trigger condition is based, at least in part, on at least one of:

a position of the UE;
   a movement of the UE;
   a power condition of the UE;
   a thermal condition of the UE; or
   a signal quality issue detected by the UE.

18. The method of claim 17,
   wherein the signal quality issue is detected by the UE based, at least in part, on a signal quality metric decreasing below a threshold associated with the signal quality metric, and wherein the threshold includes a value associated with the signal quality metric and a minimum time below the value.

19. The method of claim 16,
   wherein the timing offset accommodates DCI decoding, processing, and beam switching delay.

20. The method of claim 16,
   wherein the plurality of timing offset categories includes timing offset categories associated with one or more of an intra antenna panel receive beam sweep, an inter antenna panel receive beam sweep, or an inter antenna panel receive beam sweep to a deactivated antenna panel.

\* \* \* \* \*